(12) United States Patent
Weber et al.

(10) Patent No.: US 7,189,186 B2
(45) Date of Patent: Mar. 13, 2007

(54) BRAKE TRANSMISSION SHIFT INTERLOCK ACTUATOR

(75) Inventors: Alexis C. Weber, Chihuahua (MX); Alejandro Moreno, El Paso, TX (US)

(73) Assignee: Delphi Technologies, Inc, Troy, MI (US)

( * ) Notice: Subject to any disclaimer, the term of this patent is extended or adjusted under 35 U.S.C. 154(b) by 327 days.

(21) Appl. No.: 10/632,280

(22) Filed: Aug. 1, 2003

(65) Prior Publication Data

US 2005/0037890 A1 Feb. 17, 2005

(51) Int. Cl.
  *F16H 59/74* (2006.01)
(52) U.S. Cl. ............................. 477/99; 477/92; 477/94; 477/96; 188/163
(58) Field of Classification Search .................. 477/92, 477/94, 96, 99; 188/69, 158, 161, 163, 166, 188/265, 372; 192/220.4; 335/225, 257, 335/262, 263, 271, 273, 277
See application file for complete search history.

(56) References Cited

U.S. PATENT DOCUMENTS

| 3,461,412 | A | * | 8/1969 | Henderson | 335/281 |
|---|---|---|---|---|---|
| 3,488,611 | A | * | 1/1970 | Harper | 335/170 |
| 4,462,013 | A | * | 7/1984 | Ueda et al. | 335/229 |
| 4,987,968 | A | * | 1/1991 | Martus et al. | 180/272 |
| 5,647,465 | A | * | 7/1997 | Burkhard et al. | 192/220.4 |
| 5,759,132 | A | * | 6/1998 | Osborn et al. | 477/96 |
| 5,825,270 | A | * | 10/1998 | Hattori et al. | 335/223 |
| 6,142,282 | A | * | 11/2000 | Rudisil et al. | 192/220.4 |
| 6,315,088 | B1 | * | 11/2001 | Gustin et al. | 188/161 |
| 6,319,169 | B1 | | 11/2001 | Avila | |
| 6,592,492 | B1 | * | 7/2003 | Kalia | 477/96 |
| 2001/0032633 | A1 | * | 10/2001 | Bircann et al. | 123/568.21 |
| 2003/0139253 | A1 | * | 7/2003 | Gruden | 477/96 |

* cited by examiner

Primary Examiner—David D. Le
(74) Attorney, Agent, or Firm—Paul L Marshall

(57) ABSTRACT

A brake transmission shift interlock actuator includes a bobbin that has an open end and a closed end. A plunger is slidably disposed within the bobbin and a plunger rod extends from the plunger. Moreover, a primary plate is installed within the open end of the bobbin. The plunger is movable between an unlocked position, wherein the plunger rod does not extend through the primary plate and a locked position, wherein a first end of the plunger rod extends through a bore formed by the primary plate. Further, a magnetic force of attraction between the plunger and the primary plate diminishes as the plunger approaches the primary plate.

18 Claims, 2 Drawing Sheets

US 7,189,186 B2

BRAKE TRANSMISSION SHIFT INTERLOCK ACTUATOR

TECHNICAL FIELD

The present invention relates to electromechanical locking mechanisms for motor vehicle transmissions.

BACKGROUND OF THE INVENTION

Many vehicles available today are equipped with a safety mechanism that prevents an automatic transmission from being shifted into gear unless the driver is pressing the brake pedal. This safety feature prevents a vehicle from inadvertently being shifted into gear when the driver is out of the vehicle or when he or she is not yet ready to move.

Current state of the art transmission locks include devices such as ratchet-type mechanisms and locking-pin mechanisms. The present invention recognizes that these alternative transmission locks include numerous parts and components that increase manufacturing time and production costs. Moreover, because of the amount of moving parts included in these alternative transmission locks, they tend to rattle, e.g., while the vehicle is in motion, and thus increase noise in the driver/passenger compartment.

The present invention has recognized these prior art drawbacks, and has provided the below-disclosed solutions to one or more of the prior art deficiencies.

SUMMARY OF THE INVENTION

A brake transmission shift interlock actuator, includes a bobbin that defines an open end. A plunger is slidably disposed within the bobbin. A plunger rod extends from the plunger and a primary plate is installed within the open end of the bobbin. A magnetic force of attraction between the plunger and the primary plate diminishes as the plunger approaches the primary plate.

In a preferred embodiment, the plunger is movable between an unlocked position and a locked position. In the unlocked position, the plunger rod does not extend through the primary plate. In the locked position, a first end of the plunger rod extends through a bore formed by the primary plate. Preferably, the bobbin defines a closed end. The closed end of the bobbin includes a pocket and plural ribs extend radially into the pocket.

Preferably, the plunger rod defines a second end that extends beyond the plunger. The second end of the plunger rod abuts the closed end of the bobbin when the plunger is in the unlocked position. In a preferred embodiment, an O-ring damper support face is established around the outer periphery of the plunger and a first O-ring damper is disposed around the plunger adjacent to the O-ring damper support face. Moreover, a second O-ring damper is disposed around the second end of the plunger rod. Preferably, a spring is installed in compression between the primary plate and the plunger. The spring biases the plunger from the locked position to the unlocked position.

In another aspect of the present invention, an electromechanical transmission locking system includes a vehicle power supply and an ignition switch that is electrically coupled to the vehicle power supply. The system further includes a brake pedal switch. In this aspect of the present invention, a brake transmission shift interlock actuator is coupled to the ignition switch and the brake pedal switch. The brake transmission shift interlock actuator includes a primary plate and a plunger. When the brake transmission shift interlock actuator is energized, the plunger moves toward the primary plate. A magnetic force of attraction between the plunger and the primary plate diminishes as the plunger approaches the primary plate. In this system, a transmission shift lever is mechanically coupled to the brake transmission shift interlock actuator. An automatic transmission is mechanically coupled to the transmission shift lever.

In yet another aspect of the present invention, a brake transmission shift interlock actuator includes a plunger and a primary plate. When the actuator is energized, the plunger moves toward the primary plate. In this aspect, a magnetic force of attraction between the plunger and the primary plate diminishes as the plunger approaches the primary plate.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
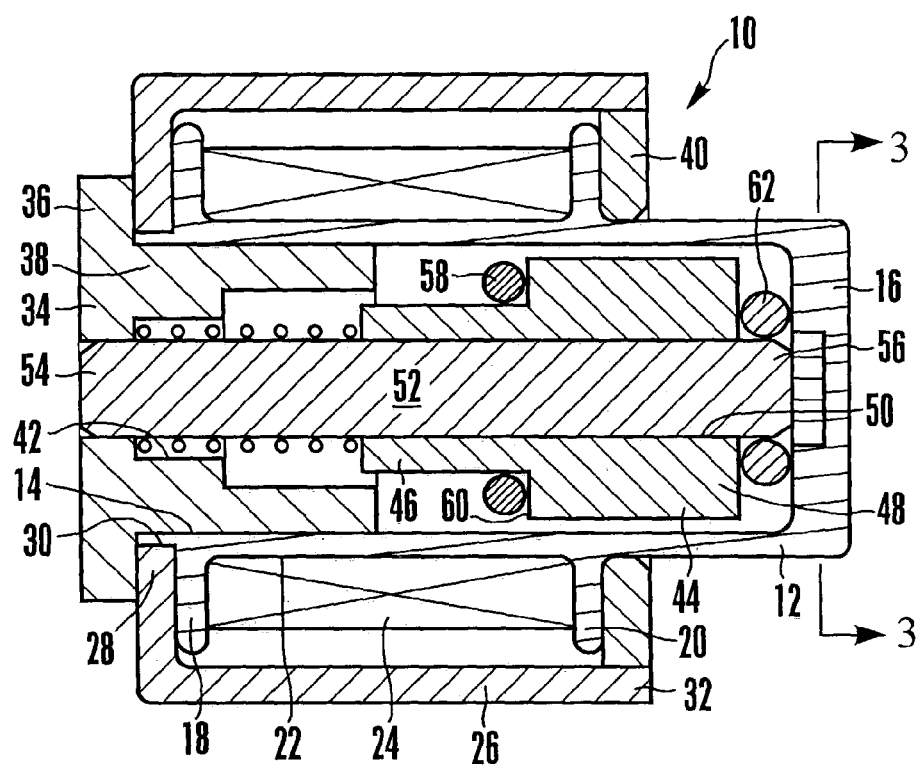
FIG. 1 is a cross section view of a brake transmission shift interlock actuator in the de-energized position.

Referring initially to FIG. 1, a brake transmission shift interlock actuator is shown and is generally designated 10. FIG. 1 shows that the actuator 10 includes a bobbin 12 that defines an open end 14 and closed end 16. A first flange 18 extends radially from the bobbin 12 around the open end 14 thereof. Preferably, a second flange 20 extends radially from the bobbin 12 slightly past the midpoint of the bobbin 12. A winding area 22 is established around the bobbin 12 between the first flange 18 and the second flange 20. As shown, a coil 24 is wound or otherwise formed around the bobbin 12 within the winding area 22.

In a preferred embodiment, a generally U-shaped frame 26 is installed around the bobbin 12 and extends from the first flange 18 to just beyond the second flange 20 to enclose the winding area 22. The U-shaped frame 26 defines a first end 28 that establishes a bore 30 and a second end 32 that is open. Preferably, a primary plate 34 is installed in the open end 14 of the bobbin 12 through the bore 30 formed in the first end 28 of the frame 26. As shown, the primary plate 34 includes a flange 36 that extends from a central hub 38. FIG. 1 shows that the first end 28 of the frame 26 is sandwiched between the flange 36 established by the primary plate 34 and the first flange 18 established by the bobbin 12. It can be appreciated that the frame 26 is held firmly in place around the bobbin 12 by the primary plate 34, e.g., by a staking operation performed on the primary plate 34 adjacent to the frame 26. A secondary plate 40 can be installed within the second end 32 of the frame 26 adjacent to the second flange 20 that extends from the bobbin 12.

As further shown in FIG. 1, the primary plate 34 is formed with a central bore 42. FIG. 1 also shows an plunger 44 that is slidably disposed within the bobbin 12. As shown, the plunger 44 defines a first end 46 and a second end 48. Moreover, the plunger 44 is formed with a central bore 50 along the entire length of the plunger 44. A generally cylindrical, solid plunger rod 52 is press fitted within the bore 50 formed in the plunger 44. The plunger rod 52 defines a first end 54 and a second end 56. The first end 54 of the plunger rod 52 extends through the plunger 44 and is flush with the outer face of the flange 36 established by the primary plate 34. The second end 56 of the plunger rod 52 extends slightly beyond the second end 48 of the plunger 44 and abuts the closed end 16 of the bobbin 12 when the actuator 10 is de-energized.

FIG. 1 shows that a first O-ring damper 58 is installed around the first end 46 of the plunger 44 adjacent to a O-ring damper 58 support face 60 established around the outer periphery of the plunger 44. Further, a second O-ring damper 62 is installed around the second end 56 of the plunger rod 52 adjacent to the second end 48 of the plunger 44. During operation, the first O-ring damper 58 and the second O-ring damper 62 prevent the plunger 44 from directly impacting the primary plate 34 and the bobbin 12, respectively. As shown, a spring 64 is installed in compression between the first end 46 of the plunger 44 and the primary plate 34. The spring 64 can bias the actuator 10 from the locked position to the unlocked position. It can be appreciated that a spring external to the actuator 10, e.g., in a linkage connected to the actuator 10, can bias the actuator 10 from the locked position to the unlocked position.

Figure 3:
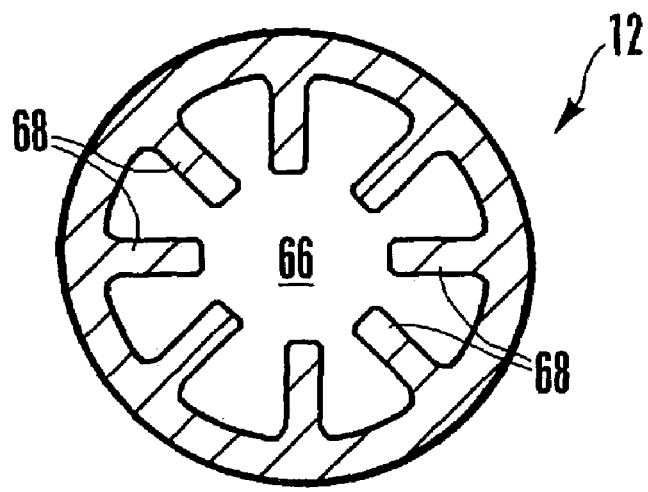
FIG. 3 is a cross-section view of the brake transmission shift interlock actuator taken along line 3—3 in FIG. 1.

Referring to FIG. 3, further details concerning the construction of the bobbin 12 are shown. FIG. 3 shows that the closed end 16 of the bobbin 12 is formed with a pocket 66. In an exemplary, non-limiting embodiment as shown, eight dampening ribs 68 extend radially from the outer wall of the bobbin 12 into the pocket 66. It is to be understood that the dampening ribs 68 create multiple line contact zones with the second O-ring damper 62. Moreover, the dampening ribs 68 stiffen the closed end 16 of the bobbin 12 to reduce noise from a "drum effect" and prevent the plunger 44 from getting stuck in the de-energized position, e.g., by adhesion between the second end 56 of the plunger rod 52 and the second end 16 of the bobbin 12 or by the second end 56 of the plunger rod 52 drawing a vacuum against the second end 16 of the bobbin 12.

Figure 4:
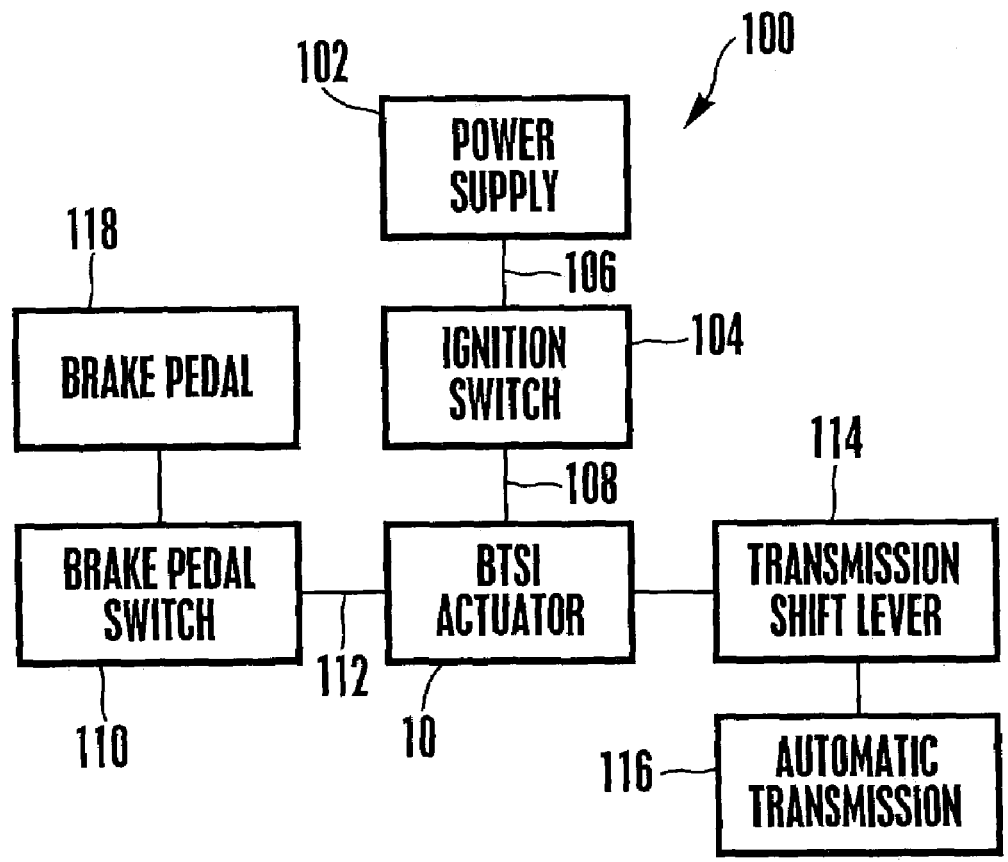
FIG. 4 is a block diagram of an electromechanical transmission locking system.

Referring now to FIG. 4, an electromechanical transmission locking system that incorporates the actuator 10 of the present invention is shown and is generally designated 100. FIG. 4 shows that the locking system 100 includes a vehicle power supply 102 that is electrically coupled to an ignition switch 104 via an electrical line 106. The actuator 10, more specifically the coil 24 therein, is electrically coupled to the ignition switch 104 via an electrical line 108 and to a brake pedal switch 110 via an electrical line 112. FIG. 4 also shows that the actuator 10 is mechanically coupled to a transmission shift lever 114 that, in turn, is mechanically coupled to an automatic transmission 116. Moreover, the brake pedal switch 110 is mechanically coupled to a brake pedal 118. It is to be understood that the actuator 10 can engage the transmission shift lever 114 to prevent it from moving. This engagement can be undertaken directly, e.g., by engaging a depression formed by the transmission shift lever 114, or indirectly, e.g., by engaging a mechanical linkage connected to the transmission shift lever 114.

Operation

Initially, when the coil 24 is de-energized, the actuator 10 is in the unlocked position, as shown in FIG. 1. In the unlocked position, the force of the spring 64 forces the plunger 44 and plunger rod 52 to the right looking at FIG. 1 so that the second O-ring damper 62 abuts the closed end 16 of the bobbin 12.

Figure 2:
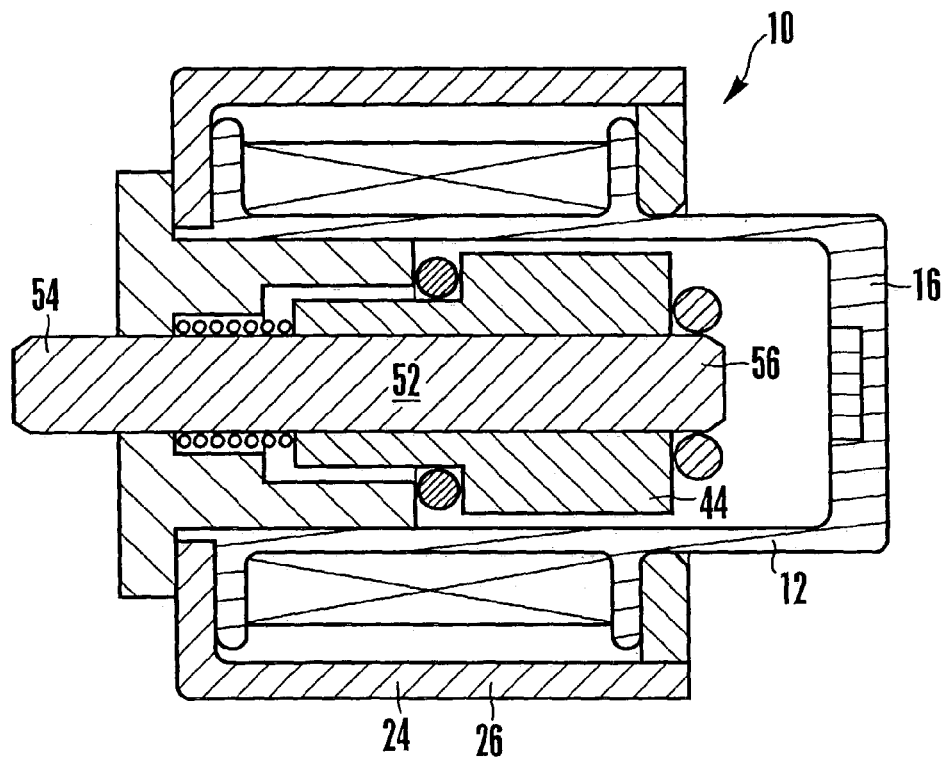
FIG. 2 is a cross section view of a brake transmission shift interlock actuator in the energized position.

If the vehicle ignition switch 102 is turned on and the brake pedal depress switch 110 is not activated, power is supplied to the coil 24 of the actuator 10. When the coil 24 is energized, the actuator 10 moves to the locked position, as shown in FIG. 2. In the locked position, the plunger 44 and the plunger rod 52 are moved to the left looking at FIG. 2 so that the first end 54 of the plunger rod 52 extends beyond the primary plate 34. In the locked position, the first end 54 of the plunger rod 52 can engage a bore or other depression formed in the transmission shift lever 114 to prevent the transmission shift lever 114 from being moved to put the automatic transmission in gear.

However, depressing the brake pedal 118 activates the brake pedal switch 110 to interrupt the power supply to the coil 24. Consequently, the spring 64 biases the actuator 10 to the unlocked position wherein the plunger rod 52 is retracted back into the actuator 10 as shown in FIG. 1. It is to be understood that the shape of the plunger 44 and the shape of the primary plate 34 provides an actuator 10 in which the magnetic force of attraction between the two decreases as the plunger 44 moves toward the primary plate 34. This can be partially attributed to the manner in which the first end 46 of the actuator 44 moves into the central bore 42 formed by the primary plate 34 when the coil 24 is energized. Accordingly, the noise due to the impact of the plunger 44 with the primary plate 34 is reduced.

With the configuration of structure described above, it can be appreciated that the brake transmission interlock actuator 10 can effectively prevent an automatic transmission from being placed into gear without depressing the brake pedal 118.

While the particular BRAKE TRANSMISSION SHIFT INTERLOCK ACTUATOR as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A brake transmission shift interlock actuator, comprising:

a bobbin defining an open end;

a plunger slidably disposed within the bobbin;

a plunger rod extending from the plunger;

a portion of a central hub of a primary plate installed within the open end of the bobbin;

wherein a magnetic force of attraction between the plunger and the primary plate diminishes as the plunger approaches the primary plate; and wherein the plunger is movable between an unlocked position, wherein the plunger rod does not extend through the primary plate and a locked position, wherein at least a first end of the plunger rod extends through a bore formed by the primary plate;

and wherein the bobbin defines a closed end, the closed end of the bobbin comprising:

a pocket; and plural ribs extending radially into the pocket.

2. The actuator of claim 1, wherein the plunger rod defines a second end that extends beyond the plunger, the second end of the plunger rod abutting the closed end of the bobbin when the plunger is in the unlocked position.

3. The actuator of claim 2, further comprising:

an O-ring damper support face established around the outer periphery of the plunger; and a first O-ring damper disposed around the plunger adjacent to the O-ring damper support face.

4. The actuator of claim 3, further comprising:

a second O-ring damper disposed around the second end of the plunger rod.

5. The actuator of claim 4, further comprising:

a spring biasing the plunger from the locked position to the unlocked position.

6. The actuator of claim 5, wherein the spring is installed in compression between the primary plate and the plunger.

7. An electro-mechanical transmission locking system, comprising:

a vehicle power supply;

an ignition switch electrically coupled to the vehicle power supply;

a brake pedal switch;

a brake transmission shift interlock actuator coupled to the ignition switch and the brake pedal switch, the brake transmission shift interlock actuator comprising:

a primary plate and a plunger, wherein the plunger moves toward the primary plate when the brake transmission shift interlock actuator is energized, and wherein a magnetic force of attraction between the plunger and the primary plate diminishes as the plunger approaches the primary plate;

a bobbin defining an open end;

the plunger slidably disposed within the bobbin;

a plunger rod extending from the plunger; and a portion of a central hub of the primary plate installed within the open end of the bobbin;

a transmission shift lever mechanically coupled to the brake transmission shift interlock actuator wherein the plunger is movable between an unlocked position, wherein the plunger rod does not extend through the primary plate and a locked position, wherein at least a first end of the plunger rod extends through a bore formed by the primary plate to prevent the transmission shift lever from moving; and an automatic transmission mechanically coupled to the transmission shift lever;

and wherein the bobbin defines a closed end, the closed end of the bobbin comprising:

a pocket; and plural ribs extending radially into the pocket.

8. The system of claim 7, wherein the plunger rod defines a second end that extends beyond the plunger, the second end of the plunger rod abutting the closed end of the bobbin when the plunger is in the unlocked position.

9. The system of claim 8, further comprising:

an O-ring damper support face established around the outer periphery of the plunger; and a first O-ring damper disposed around the plunger adjacent to the O-ring damper support face.

10. The system of claim 9, further comprising:

a second O-ring damper disposed around the second end of the plunger rod.

11. The system of claim 10, further comprising:

a spring biasing the plunger from the locked position to the unlocked position.

12. The system of claim 11, wherein the spring is installed in compression between the primary plate and the plunger.

13. A brake transmission shift interlock actuator, comprising:

a plunger; and a primary plate;

a plunger rod extending from the plunger;

a bobbin defining an open end;

wherein the plunger is slidably disposed within the bobbin;

wherein a portion of a central hub of the primary plate is installed within the open end of the bobbin;

wherein the plunger moves toward the primary plate when the actuator is energized and wherein a magnetic force of attraction between the plunger and the primary plate diminishes as the plunger approaches the primary plate; and wherein the plunger is movable between an unlocked position, wherein the plunger rod does not extend through the primary plate and a locked position, wherein at least a first end of the plunger rod extends through a bore formed by the primary plate;

and wherein the bobbin defines a closed end, the closed end of the bobbin comprising:

a pocket; and plural ribs extending radially into the pocket.

14. The actuator of claim 13, wherein the plunger rod defines a second end that extends beyond the plunger, the second end of the plunger rod abutting the closed end of the bobbin when the plunger is in the unlocked position.

15. The actuator of claim 14, further comprising:

an O-ring damper support face established around the outer periphery of the plunger; and a first O-ring damper disposed around the plunger adjacent to the O-ring damper support face.

16. The actuator of claim 15, further comprising:

a second O-ring damper disposed around the second end of the plunger rod.

17. The actuator of claim 16, further comprising:

a spring biasing the plunger from the locked position to the unlocked position.

18. The actuator of claim 17, wherein the spring is installed in compression between the primary plate and the plunger.

* * * * *